(12) United States Patent
Nishikawa

(10) Patent No.: US 7,499,193 B2
(45) Date of Patent: Mar. 3, 2009

(54) IMAGE FORMING APPARATUS

(75) Inventor: Eiji Nishikawa, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 856 days.

(21) Appl. No.: 10/875,376

(22) Filed: Jun. 24, 2004

(65) Prior Publication Data

US 2005/0007440 A1     Jan. 13, 2005

(30) Foreign Application Priority Data

Oct. 7, 2003    (JP)    ............... 2003-348355

(51) Int. Cl.
H04N 1/60    (2006.01)
H04N 1/36    (2006.01)
H04N 1/40    (2006.01)
H04N 1/393   (2006.01)
H04N 1/04    (2006.01)
G03G 15/01   (2006.01)

(52) U.S. Cl. .................. 358/1.9; 358/409; 358/412; 358/445; 358/448; 358/451; 358/471; 358/486; 358/496; 358/497; 358/3.21; 347/116; 347/118; 347/232; 347/235; 399/301; 399/302

(58) Field of Classification Search ............... 358/1.9, 358/471, 445, 451, 448, 3.21, 486, 496, 412, 358/409, 497; 250/584, 585, 586, 587; 382/132; 345/439; 347/241, 256, 235, 242, 248, 250, 347/257, 258, 239, 255, 116, 118, 232; 399/301, 399/167, 302

See application file for complete search history.

(56) References Cited

U.S. PATENT DOCUMENTS 6,005,587 A * 12/1999 Takahashi et al. ............ 715/733

(Continued)

FOREIGN PATENT DOCUMENTS

JP    2001-265090    9/2001

(Continued)

OTHER PUBLICATIONS

Japanese Office Action for Application No. 2003-348355 mailed Oct. 24, 2006.

(Continued)

Primary Examiner—Edward L Coles
Assistant Examiner—Charlotte M Baker
(74) Attorney, Agent, or Firm—Cantor Colburn LLP

(57) ABSTRACT

There is described an apparatus, which includes an image-forming section to form a multicolor image on a recording medium by recording the unicolor images in such a manner that the unicolor images overlap each other, based on printing image data sets of them, and a controlling section that determines at least a sub-scanning velocity in a sub-scanning direction relative to the recording medium, corresponding to a printing magnification factor, so as to adjust an output-start timing in the sub-scanning direction for every printing image data set, in response to the sub-scanning velocity determined in advance. Further, the controlling section also determines a main-scanning velocity in a main-scanning direction, corresponding to the printing magnification factor, so as to adjust output-start timings in both the main-scanning direction and the sub-scanning direction for every printing image data set, in response to the main-scanning velocity and the sub-scanning velocity, both determined in advance.

23 Claims, 7 Drawing Sheets

U.S. PATENT DOCUMENTS 6,336,024 B1 * 1/2002 Kanaya et al. ............... 399/301
6,580,525 B1 * 6/2003 Iwakiri et al. ................ 358/471
7,050,082 B2 * 5/2006 Suzuki et al. ............... 347/241

FOREIGN PATENT DOCUMENTS

| JP | 2002-305653 | 10/2002 |
| JP | 2003-5461 | 1/2003 |
| JP | 2003-262991 | 9/2003 |

OTHER PUBLICATIONS

Japanese Office Action for Japanese Patent Application No. 2003-348355 mailed Mar. 6, 2007 with English Translation.

* cited by examiner

IMAGE FORMING APPARATUS

BACKGROUND OF THE INVENTION

The present invention relates to an image forming apparatus for color printing by overlapping a plurality of unicolor images sequentially.

In the prior art, there has been developed an image forming apparatus such as a printer and a multifunction device capable of printing at varying printing magnification factors on the recording medium for printing such as paper. For example, Patent Document 1 discloses a technique for forming an image in response to a desired printing magnification factor by adjusting the scanning velocity in a sub-scanning direction on printing paper.

[Patent Document 1]

Official Gazette of Japanese Patent Tokkai 2002-305653

The aforementioned prior art, however, has the following problems: When color printing is carried out by forming a color image by overlapping a plurality of unicolor images (e.g. yellow, magenta, cyan, black, etc.), the scanning velocity in the sub-scanning direction will be changed if the printing magnification factor is modified. This will lead to misregistration in the printed positions of various colors resulting from modification of the scanning velocity.

For example, when color printing is applied to both sides of one printing paper, the temperature of printing paper in reverse side printing mode rises over that in the obverse side printing if printing is applied on the reverse side subsequent to printing on the obverse side. This produces a change in the size of the printing paper. This requires the printing magnification factor for the reverse side to be modified in duplex printing mode. In such a case, even if the optimum printing position is set for the obverse side, color drift will occur on the reverse side where printing magnification factor has been modified.

As described above, in color printing mode, modification of the printing magnification factor (especially when printing on the reverse side in duplex printing) leads to unexpected color drift, and causes deterioration in color printing image quality.

SUMMARY OF THE INVENTION

To overcome the abovementioned drawbacks in conventional image-recording apparatus, it is an object of the present invention to provide high-precision high-quality color image formation free of color drift on the printed images, even if the printing magnification factor has been modified.

Accordingly, to overcome the cited shortcomings, the abovementioned object of the present invention can be attained by image-forming apparatus and methods described as follow.

(1) An image-forming apparatus, comprising: an image-forming section to form a multicolor image on a recording medium by recording a plurality of unicolor images in such a manner that the plurality of unicolor images overlap each other, based on printing image data sets, each of which represents each of the plurality of unicolor images; and a controlling section that determines at least a sub-scanning velocity in a sub-scanning direction relative to the recording medium, corresponding to a printing magnification factor, so as to adjust at least an output-start timing in the sub-scanning direction for every printing image data set, representing each of the unicolor images, in response to the sub-scanning velocity determined in advance.

(2) The image-forming apparatus of item 1, wherein the controlling section also determines a main-scanning velocity in a main-scanning direction relative to the recording medium, corresponding to the printing magnification factor, so as to adjust output-start timings in both the main-scanning direction and the sub-scanning direction for every printing image data set, representing each of the unicolor images, in response to the main-scanning velocity and the sub-scanning velocity, both determined in advance.

(3) The image-forming apparatus of item 1, further comprising: an inputting section to input the printing magnification factor; wherein the controlling section adjusts the output-start timing, corresponding to the printing magnification factor inputted by the inputting section.

(4) The image-forming apparatus of item 1, wherein the controlling section adjusts the output-start timing, based on a misregistration amount in the sub-scanning direction at an image-forming position at which each of the unicolor images is recorded with the sub-scanning velocity determined in advance.

(5) The image-forming apparatus of item 4, wherein the controlling section detects the misregistration amount, so as to adjust the output-start timing, based on the misregistration amount detected in advance.

(6) The image-forming apparatus of item 4, wherein the controlling section calculates the misregistration amount, so as to adjust the output-start timing, based on the misregistration amount calculated in advance.

(7) An image-forming apparatus, comprising: an image-forming section to form a multicolor image on a recording medium by recording a plurality of unicolor images in such a manner that the plurality of unicolor images overlap each other, based on printing image data sets, each of which represents each of the plurality of unicolor images; and
a controlling section that modifies at least a sub-scanning velocity in a sub-scanning direction relative to the recording medium, corresponding to an instruction of modifying a printing magnification factor, so as to adjust at least an output-start timing in the sub-scanning direction for every printing image data set, representing each of the unicolor images, in response to the sub-scanning velocity modified in advance.

(8) The image-forming apparatus of item 7, wherein the controlling section also modifies a main-scanning velocity in a main-scanning direction relative to the recording medium, corresponding to the instruction of modifying the printing magnification factor, so as to adjust output-start timings in both the main-scanning direction and the sub-scanning direction for every printing image data set, representing each of the unicolor images, in response to the main-scanning velocity and the sub-scanning velocity, both modified in advance.

(9) The image-forming apparatus of item 7, wherein the controlling section adjusts the output-start timing, based on a misregistration amount in the sub-scanning direction at an image-forming position at which each of the unicolor images is recorded with the sub-scanning velocity modified in advance.

(10) The image-forming apparatus of item 9, wherein the controlling section detects the misregistration amount, and then, adjusts the output-start timing, based on the misregistration amount detected in advance.

(11) The image-forming apparatus of item 9, wherein the controlling section calculates the misregistration amount, so as to adjust the output-start timing, based on the misregistration amount calculated in advance.

(12) An image-forming apparatus, comprising: an image-forming section to form a multicolor obverse-image on an obverse side of a recording medium by recording a plurality of unicolor images in such a manner that the plurality of unicolor images overlap each other, based on printing image data sets, each of which represents each of the plurality of unicolor images, wherein the image-forming section also forms a multicolor reverse-image on an reverse side of the recording medium in a same manner as that for the obverse side, as needed; and a controlling section that modifies at least a sub-scanning velocity in a sub-scanning direction relative to the recording medium, corresponding to a printing magnification factor of the multicolor reverse-image, so as to adjust at least an output-start timing in the sub-scanning direction for every printing image data set, representing the plurality of unicolor images, in response to the sub-scanning velocity modified in advance.

(13) The image-forming apparatus of item 12, wherein, when forming duplex images on both sides of the recording medium, the controlling section modifies at least a first sub-scanning velocity, for forming the multicolor obverse-image, in a sub-scanning direction relative to the recording medium, corresponding to the printing magnification factor of the multicolor reverse-image, and then, adjusts at least a second output-start timing in the sub-scanning direction for every printing image data set, representing each of unicolor images for forming the multicolor reverse-image, so that the second output-start timing is different form a first output-start timing in the sub-scanning direction for every printing image data set, representing each of unicolor images for forming the multicolor obverse-image.

(14) The image-forming apparatus of item 12, wherein, when forming duplex images on both sides of the recording medium, the controlling section also modifies a main-scanning velocity in a main-scanning direction relative to the recording medium, corresponding to the printing magnification factor of the multicolor reverse-image, so as to adjust output-start timings in both the main-scanning direction and the sub-scanning direction for every printing image data set, representing each of the unicolor images, in response to the main-scanning velocity and the sub-scanning velocity, both modified in advance.

(15) The image-forming apparatus of item 12, further comprising: an inputting section to input the printing magnification factor of the multicolor reverse-image; wherein the controlling section adjusts the output-start timing, corresponding to the printing magnification factor inputted by the inputting section.

(16) The image-forming apparatus of item 12, wherein the controlling section adjusts the output-start timing, based on a misregistration amount in the sub-scanning direction at an image-forming position at which each of the unicolor images is recorded with the sub-scanning velocity modified in advance.

(17) The image-forming apparatus of item 16, wherein the controlling section detects the misregistration amount, and then, adjusts the output-start timing, based on the misregistration amount detected in advance.

(18) The image-forming apparatus of item 16, wherein the controlling section calculates the misregistration amount, so as to adjust the output-start timing, based on the misregistration amount calculated in advance.

(19) An image-forming method for forming a multicolor image on a recording medium by recording a plurality of unicolor images in such a manner that the plurality of unicolor images overlap each other, based on printing image data sets, each of which represents each of the plurality of unicolor images, comprising the steps of: determining at least a sub-scanning velocity in a sub-scanning direction relative to the recording medium, corresponding to a printing magnification factor; and adjusting at least an output-start timing in the sub-scanning direction for every printing image data set, representing each of the unicolor images, in response to the sub-scanning velocity determined in the determining step.

(20) The image-forming method of item 19, further comprising the step of: forming the multicolor image on the recording medium, based on the output-start timing adjusted in the adjusting step and corresponding to the printing image data sets.

(21) An image-forming method for forming a multicolor image on a recording medium by recording a plurality of unicolor images in such a manner that the plurality of unicolor images overlap each other, based on printing image data sets, each of which represents each of the plurality of unicolor images, comprising the steps of: modifying at least a sub-scanning velocity in a sub-scanning direction relative to the recording medium, in response to an instruction of modifying a printing magnification factor; and adjusting at least an output-start timing in the sub-scanning direction for every printing image data set, representing the plurality of unicolor images, in response to the sub-scanning velocity modified in the modifying step.

(22) An image-forming method for forming a multicolor image on a recording medium by recording a plurality of unicolor images in such a manner that the plurality of unicolor images overlap each other, based on printing image data sets, each of which represents each of the plurality of unicolor images, comprising the steps of: modifying at least a sub-scanning velocity in a sub-scanning direction relative to the recording medium, corresponding to a printing magnification factor of a multicolor reverse-image, when forming multicolor images on both sides of the recording medium; and adjusting at least an output-start timing in the sub-scanning direction for every printing image data set, representing the plurality of unicolor images, in response to the sub-scanning velocity modified in the modifying step.

Further, to overcome the abovementioned problems, other image-forming apparatus, embodied in the present invention, will be described as follow:

(23) An image-forming apparatus, characterized in that, in the image-forming apparatus that conduct a color printing by sequentially overlapping a plurality of colors on a recording medium for printing use, there is provided with:
a controlling means for modifying each of scanning velocities relative to the recording medium in a main-scanning and a sub-scanning directions, or a scanning velocity in one scanning direction of only sub-scanning in response to an inputted instruction of modifying a magnification factor, and for adjusting an output-start timing of printing image data of each of the plurality of colors for one or every scanning direction corresponding to the modified scanning velocities.

(24) An image-forming apparatus, characterized in that, in the image-forming apparatus that conduct a color printing by sequentially overlapping a plurality of colors on a recording medium for printing use, and is capable of forming a duplex image, there is provided with:
a controlling means for modifying each of scanning velocities relative to a reverse surface in a main-scanning and a sub-scanning directions, or a scanning velocity in one scanning direction of only sub-scanning in response to an inputted instruction of modifying a magnification factor, when a printing magnification factor of the reverse surface for duplex printing is inputted, and for adjusting an output-start timing of printing image data of each of the plurality of colors for one or every scanning direction corresponding to the modified scanning velocities.

(25) The image-forming apparatus, described in item 23 or 24, characterized in that,
the controlling means detects or calculates in advance a positional deviation of each of the plurality of colors to be printed with each of the modified scanning velocities for one or every scanning direction, and then, adjusts the output-start timing of the printing image data of each of the plurality of colors for one or every scanning direction, based on the detected or calculated result.

(26) An image-forming method, characterized in that,
in the image-forming method for conducting a color printing by sequentially overlapping a plurality of colors on a recording medium for printing use, there is included:
a controlling step for modifying each of scanning velocities relative to the recording medium in a main-scanning and a sub-scanning directions, or a scanning velocity in one scanning direction of only sub-scanning in response to an inputted instruction of modifying a magnification factor, and for adjusting an output-start timing of printing image data of each of the plurality of colors for one or every scanning direction corresponding to the modified scanning velocities.

(27) An image-forming method, characterized in that,
in the image-forming method for conducting a color printing by sequentially overlapping a plurality of colors on a recording medium for printing use, and being capable of forming a duplex image, there is included:
a controlling step for modifying each of scanning velocities relative to a reverse surface in a main-scanning and a sub-scanning directions, or a scanning velocity in one scanning direction of only sub-scanning in response to an inputted instruction of modifying a magnification factor, when a printing magnification factor of the reverse surface for duplex printing is inputted, and for adjusting an output-start timing of printing image data of each of the plurality of colors for one or every scanning direction corresponding to the modified scanning velocities.

(28) The image-forming method, described in item 26 or 27, characterized in that,
in the controlling step, a positional deviation of each of the plurality of colors, to be printed with each of the modified scanning velocities for one or every scanning direction, is detected or calculated in advance, and then, the output-start timing of the printing image data of each of the plurality of colors for one or every scanning direction is adjusted, based on the detected or calculated result.

According to the present invention, when the instruction to modify the printing magnification factor has been inputted, there is a change in the scanning velocity in two scanning directions—main and sub-scanning directions—in response to the printing magnification factor having been modified. In response to the scanning velocity subsequent to modification, the output start timing for each of the preferred colors of the printing data can be adjusted in two main/sub-scanning directions or one sub-scanning direction. Further, even in the duplex printing mode, the present invention allows modification of the printing magnification factor as well as the output start timing for each color of the printing data on each side. In particular, the present invention avoids color drift caused by changing the polygon mirror rotational velocity and process velocity when adjusting the magnification factor on the reverse side.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
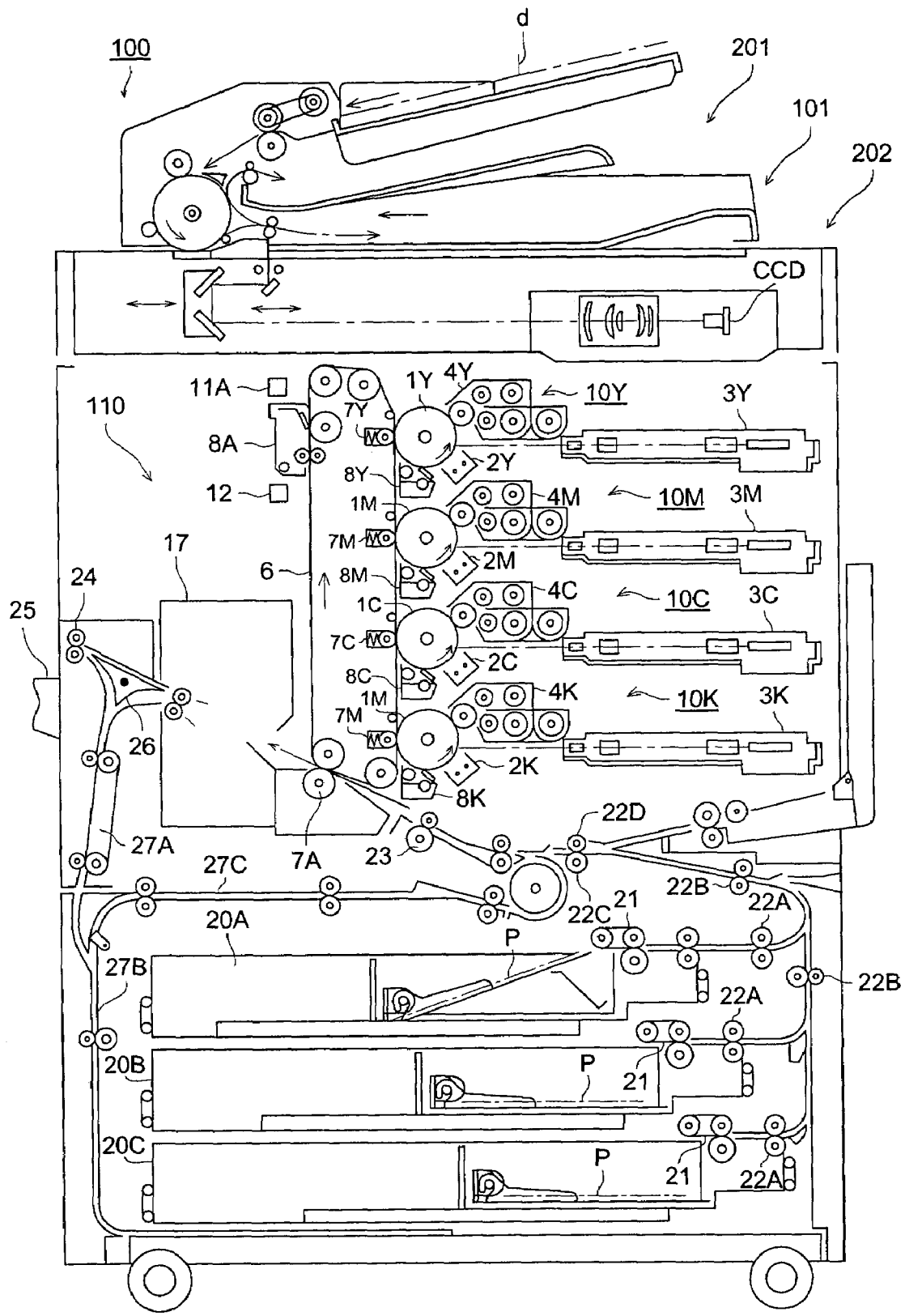
FIG. 1 is a drawing representing the arrangement of printing in a color image forming apparatus of the present invention.

The following describes one embodiment of the present invention with reference to the drawings: Referring to FIG. 1, the arrangement of printing processing in a color image forming apparatus 100 will be described first.

The color image forming apparatus 100 consists of an image forming apparatus proper 101 and an image reading apparatus 102 located on the top of the image forming apparatus proper 101. The image reading apparatus 102 includes an automatic document feed apparatus 201 and a document image scanning/exposure apparatus 202.

The document [d] placed on a document platen of the automatic document feed apparatus 201 is carried by conveyance means, and an image on one or two sides are scanned and exposed by the optical system of the document image scanning/exposure apparatus 202. The incident light reflecting the document image is read by a line image sensor CCD.

Analog processing, analog-to-digital conversion, shading correction and image compression and other processing are applied to the analog image signal subjected to photoelectric conversion by the aforementioned image sensor CCD by image processing means 70 (FIG. 2), and the analog signal is formed into digital image information, which is outputted into the image write units 3Y, 3M, 3C and 3K.

The automatic document feed apparatus 201 is provided with automatic double sided document conveyance means (not illustrated). The automatic document feed apparatus 201 continuously reads the contents of the document [d] with a great number of pages (including both sides) fed from the document platen in one operation, and stores the contents of the document into the storage means (electronic RDH function). This electronic RDH function is used when the document with a great number of pages are to be copied by the copying function or the document [d] with a great number of pages are to be sent by the facsimile function.

The image forming apparatus proper 101 is a tandem type color image forming apparatus where a plurality of photoconductor drums 1Y, 1M, 1C and 1K are arranged in a single file. Each of the photoconductor drums 1Y, 1M, 1C and 1K is provided in the image forming units 10Y, 10M, 10C and 10K for each color (yellow (Y), magenta (M), cyan (C) and black (BK)). Further, the image forming apparatus proper 101 is equipped with an intermediate transfer body 6, a paper feed/conveyance means (not illustrated) including an automatic paper re-feed mechanism (ADU mechanism) and a fixing apparatus 17 for fixing a toner image.

The image forming unit 10Y for forming a Y-color image comprises a photoconductor drum 1Y, charging means 2Y for Y-color arranged around the photoconductor drum 1Y, an image write unit 3Y, development apparatus 4Y and a cleaning means 8Y for photoconductor drum.

The image forming unit 10M for forming a M-color image comprises a photoconductor drum 1M, charging means 2M for M-color arranged around the photoconductor drum 1M, an image write unit 3M, development apparatus 4M and a cleaning means 8M for photoconductor drum.

The image forming unit 10C for forming a C-color image comprises a photoconductor drum 1C, charging means 2C for C-color arranged around the photoconductor drum 1C, an image write unit 3C, development apparatus 4C and a cleaning means 8C for photoconductor drum.

The image forming unit 10B for forming a B-color image comprises a photoconductor drum 1B, charging means 2B for B-color arranged around the photoconductor drum 1B, an image write unit 3B, development apparatus 4B and a cleaning means 8B for photoconductor drum.

The charging means 2Y and image write unit 3Y, the, charging means 2M and image write unit 3M, the charging means 2C and image write unit 3C, and the charging means 2K and image write unit 3K form latent images of respective colors on the photoconductor drums 1Y, 1M, 1C and 1K, respectively.

Figure 3:
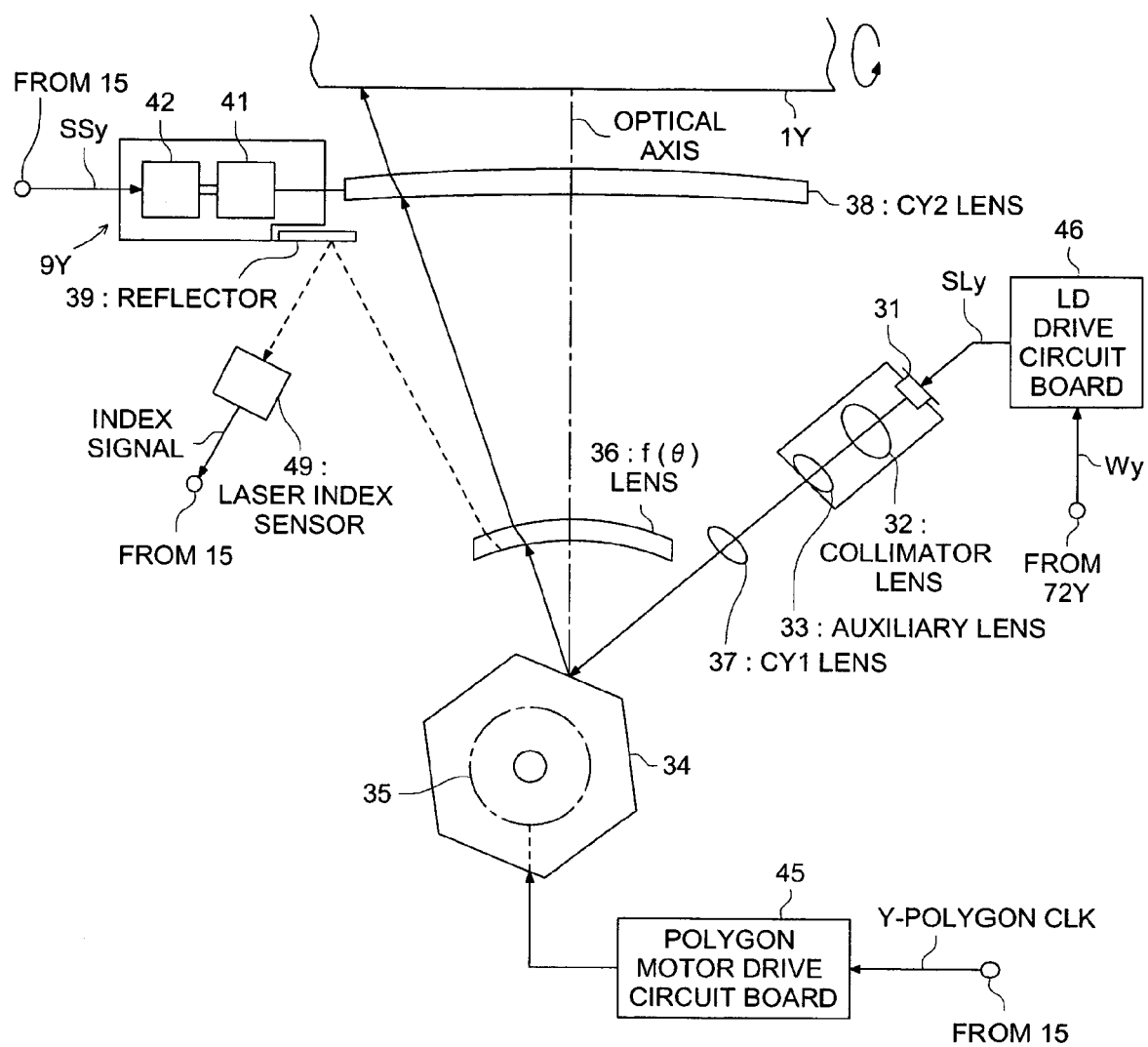
FIG. 3 is a drawing representing the configuration of an image writing unit shown in FIG. 1.

Each of the image write units 3Y, 3M, 3C and 3K makes a skew adjustment in conformity to skew adjusting signals SSy, SSm and SSc (FIG. 3). Further, each of the image write unit 3Y, 3M, 3C and 3K forms toner images of colors Y, M, C and K on the intermediate transfer body 6, based on each of the write data Wy for Y color, write data Wm for M color, write data Wc for C color and write data Wk for K color outputted from the control means 15.

Development by the development apparatuses 4Y, 4M, 4C and 4K are based on a reversed image using the development bias with a.c. voltage superimposed onto the d.c. voltage having the same polarity (negative in the present embodiment) as that of the toner used.

The belt is rotatably held by the intermediate transfer body 6, and each of the toner images of colors Y, M, C and K formed on each of the photoconductor drums 1Y, 1M, 1C and 1K is transferred on the surface of the belt of the intermediate transfer body 6.

A resist sensor 12 is provided on the right and left sides of the intermediate transfer body 6, upstream from the cleaning means 8A for intermediate transfer body. In the case of color drift to be described later, the resist sensor 12 detects the position of the image (hereinafter referred to as "resist mark CR") including the reference color for color drift correction (BK color in the present embodiment) formed on the intermediate transfer body 6 by the image forming units 10Y, 10M, 10C and 10K, and outputs the position detection signal S2 to the control means 15.

The following describes the overview of the image forming process by the aforementioned color image forming apparatus 100:

The images of colors formed by image forming units 10Y, 10M, 10C and 10K are sequentially transferred (primarily transferred) on the surface of the belt of the intermediate transfer body 6 making rotary movement, by the primary transfer rollers 7Y, 7M, 7C and 7K provided with the primary transfer bias of the polarity (positive in the present experiment) opposite to that of the toner used. Thus, a composite color image (color toner image) is produced. The color image is transferred onto the printing paper P from the intermediate transfer body 6.

The printing paper P stored in the paper feed cassettes 20A, 20B and 20C is fed by the feed-out roller 21 and paper feed roller 22A provided on each of the paper feed cassettes 20A, 20B and 20C. It is fed to the second transfer roller 7A through the conveyance rollers 22B, 22C and 22D and resist roller 23. Then a color image is transferred (secondarily transferred) onto one side (obverse side or reverse side) of the printing paper P.

The printing paper P with the color image transferred thereon is fixed by the fixing apparatus 17, and is held by an ejection roller 24 to be placed on an ejection tray 25. The transferred toner remaining on the peripheral surface of the photoconductor drums 1Y, 1M, 1C and 1K after transferring is cleaned by the cleaning means 8Y, 8M, 8C and 8K for photoconductor drum. This is followed by the next image forming cycle.

At the time of duplex image formation, an image is formed on one side (obverse side) of the printing paper P. The sheets of printing paper P discharged from the fixing apparatus 17 are branched from the sheet ejection path by branching means 26, and are reversed by the reverse/conveyance path 27B as a paper re-feed mechanism via the lower circulating paper feed path 27A. These sheets are merged at the conveyance roller 22D through the re-feed conveyance section 27C.

The printing paper P reversed and conveyed is again conveyed to the second transfer roller 7A through the resist roller 23, and a color image (color toner image) is transferred on the other side (reverse side). The printing paper P with color image transferred thereon is fixed by the fixing apparatus 17, and is held by the ejection roller 24 to be placed on the ejection tray 25 located outside. In the meantime, after the color image has been transferred on the printing paper P by the second transfer roller 7A, remaining toner is removed from the intermediate transfer body 6 separated from the printing paper P, by the cleaning means 8A.

The printing paper P includes, for example, thin paper of about 52.3 through 63.9 kg/m$^2$ (1000 sheets), plain paper of about 64.0 through 81.4 kg/m$^2$ (1000 sheets), thick paper of about 83.0 through 130.0 kg/m$^2$ (1000 sheets) and extra-thick paper of 150.0 kg/m$^2$ (about 1000 sheets). The thickness of the printing paper P is about 0.05 through 0.15 mm.

Figure 2:
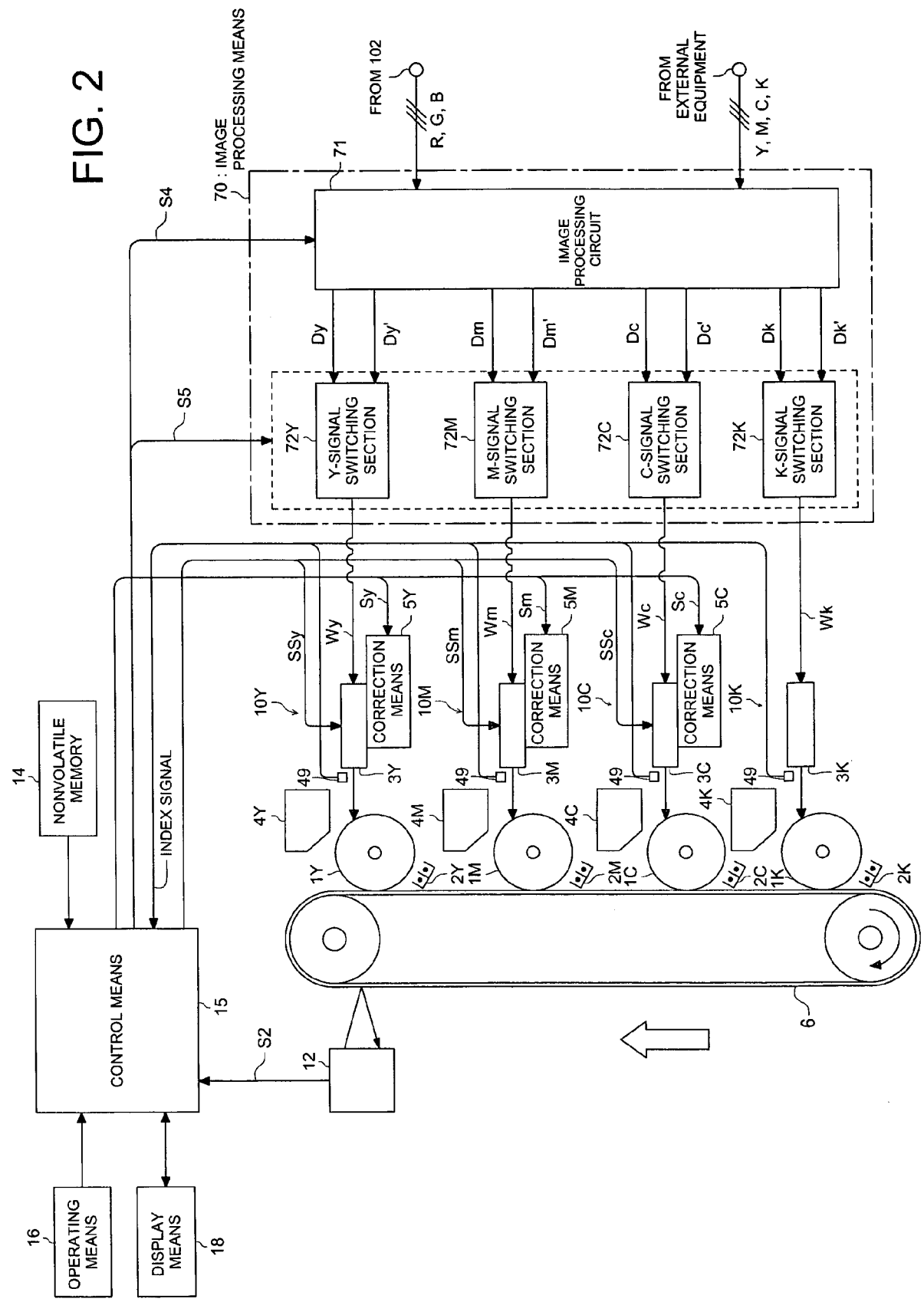
FIG. 2 is a drawing representing the arrangement of data processing in a color image forming apparatus of the present invention.

The following describes the arrangement of data processing in the color image forming apparatus, with reference to FIGS. 2 and 3:

As shown in FIG. 2, the color image forming apparatus 100 is provided with correction means 5Y, 5M, 5C and 5K, resist sensor 12, a nonvolatile memory 14, control means 15, operating means 16, display means 18, laser index sensor 49, image processing means 70 and others, in addition the aforementioned components related to printing, shown in FIG. 1.

The correction means 5Y, 5M, 5C and 5K adjust the horizontal inclination of the image write units 3Y, 3M and 3C in response to the position correction signals Sy, Sm and Sc outputted from the control means 15.

The resist sensor 12 consists of a CCD sensor, reflective photosensor and others (all not illustrated). In the automatic misregistration correction mode to be described later, the timing of the traveling of the resist mark CR (toner image shown in FIG. 5 or 6) for color drift correction formed on the intermediate transfer body 6 is detected and is detected, and the result of this detection is sent to the control means 15 as a position correction signal S2.

Figure 5:
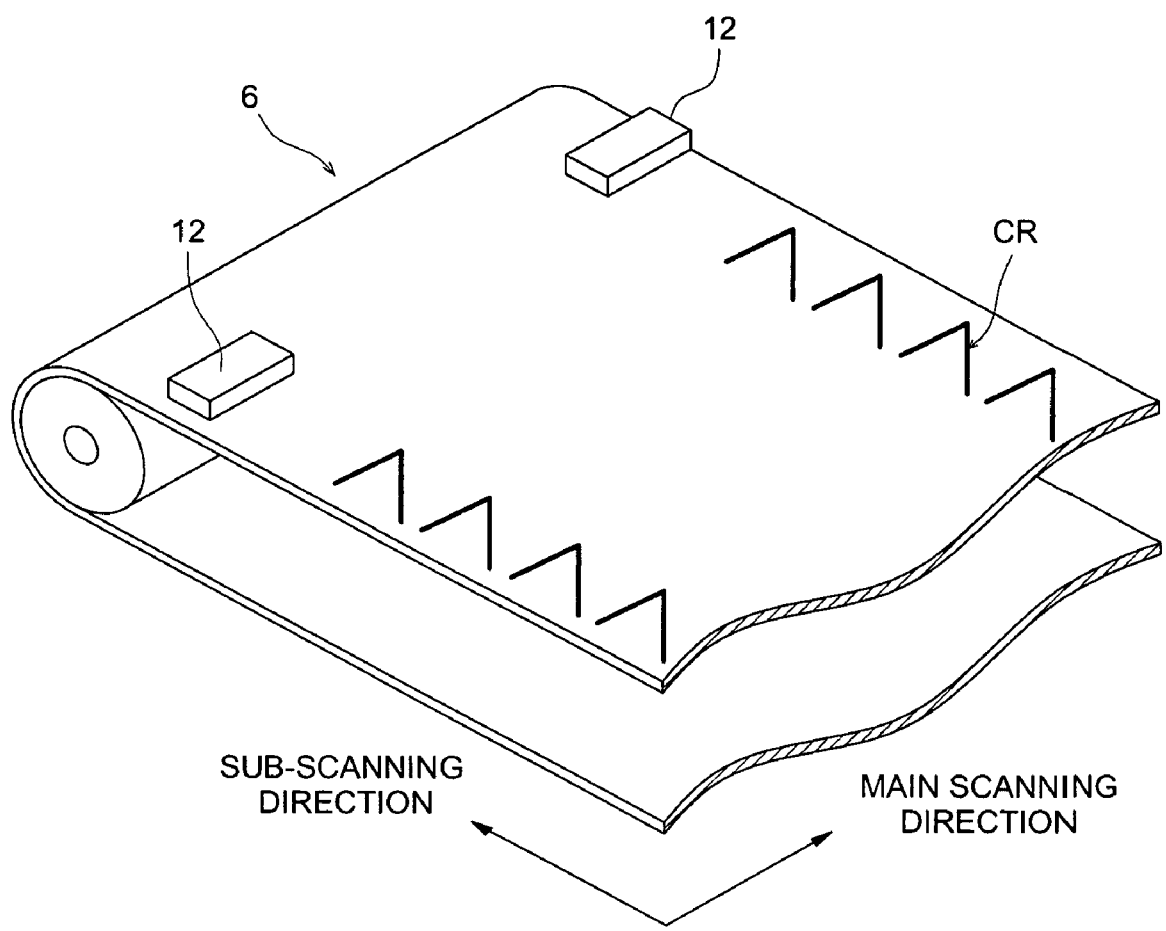
FIG. 5 is a drawing representing how a resist mark is formed on the belt of an intermediate transfer body shown in FIG. 1.
Figure 6:
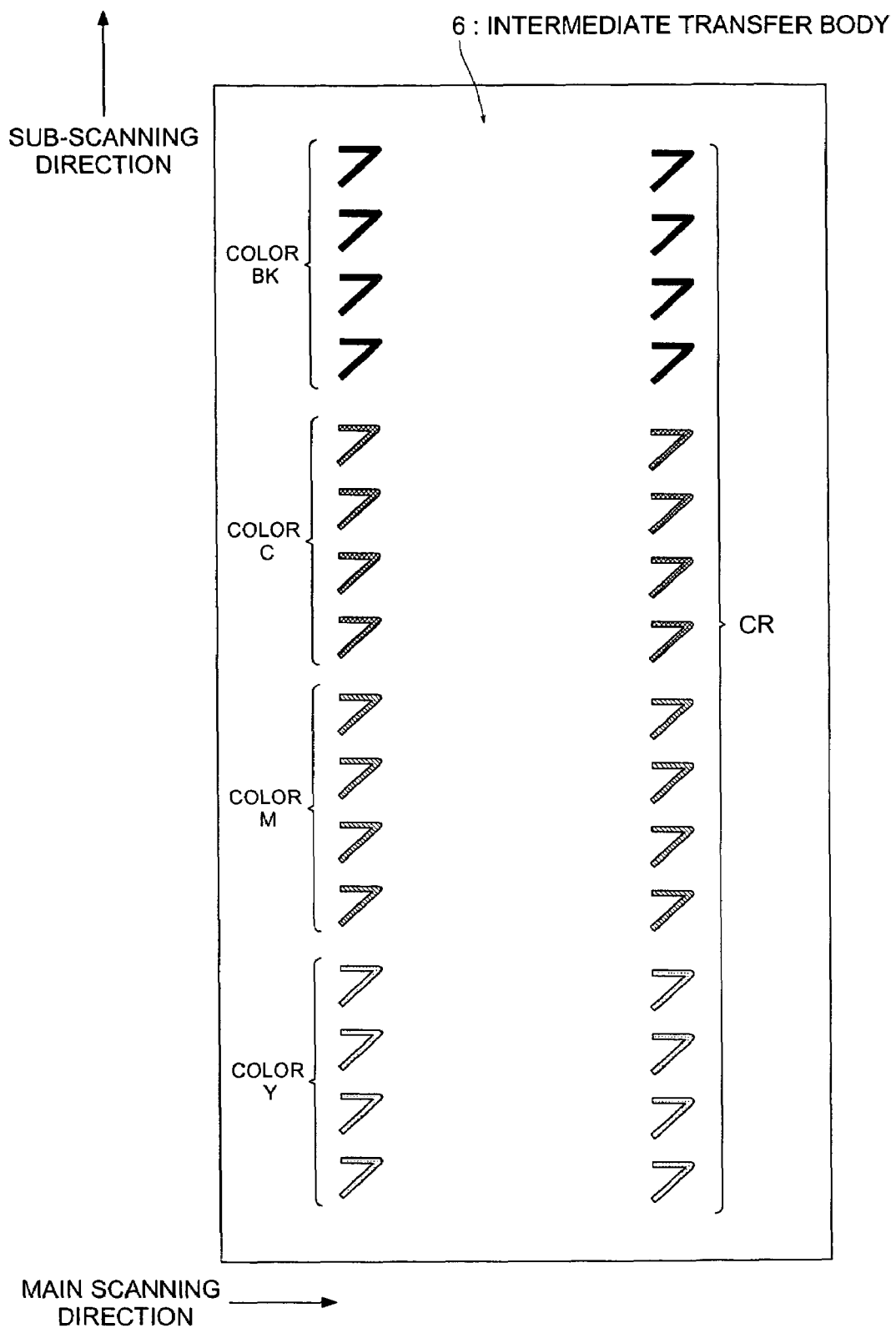
FIG. 6 is another drawing representing how a resist mark is formed on the belt of an intermediate transfer body shown in FIG. 1.

The resist mark CR is exemplified by "$$$" composed of the line segment parallel to the main scanning direction of the intermediate transfer body 6, and the line segment having a predetermined angle (e.g. 45 deg.) with respect to main scanning direction, as shown in FIG. 5 or 6.

FIG. 6 shows how four resist marks CR are formed vertically in each of the areas on the right and left for each color. Without being restricted thereto, the number of the resist marks CR can be set at any number. The greater the number of the resist marks CR, the higher is the precision in color drift correction.

The nonvolatile memory 14 stores various data items generated in the execution of various programs by the control means 15.

The control means 15 allows the program or hardware to control the color image forming apparatus 100 in a comprehensive manner.

The control means 15 controls the image forming units 10Y, 10M, 10C and 10K, and the toner images of colors Y, M, C and K are formed on the intermediate transfer body 6 based on the write data Wy for Y color, write data Wm for M color, write data Wc for C color and write data Wk for K color outputted from the image processing means 70.

The control means 15 sends the image processing control signal S4 to the image processing circuit 71 controls the operation of the image processing circuit 71.

The control means 15 sends a write select signal S5 to each of the Y-signal switching section 72Y, M-signal switching section 72M, C-signal switching section 72C and K-signal switching section 72K for control.

The write select signal S5 outputs each of the position correction signals Sy, Sm and Sc to each of the correction means 5Y, 5M and 5C to adjust each of the horizontal inclinations of the image write units 3Y, 3M and 3C.

The control means 15 outputs skew adjust signals SSy, SSm and SSc to the image write units 3Y, 3M and 3C, respectively, thereby performing skew adjustment of the image write units 3Y, 3M and 3C.

Based on the INDEX signal for each color inputted from the laser index sensor 49, the control means 15 generates the printing data output start timing.

Here the output start timing refers to the timed interval where the Y-signal switching section 72Y, M-signal switching section 72M, C-signal switching section 72C and K-signal switching section 72K output the write data Wy, Wm, Wc and Wk to the image write units 3Y, 3M, 3C and 3K, respectively.

When the instruction for modifying the printing magnification factor (e.g. printing magnification factor for the reverse side in duplex printing mode) has been inputted through the operating means 16, the control means 15 sets the process velocity or rotational velocity of the polygon mirror 34, based on the printing magnification factor having been modified and the LUT (LookUp Table) for magnification factor correction. Then printing is performed according to the new printing magnification factor.

The LUT for magnification factor correction is defined as the data representing the correspondence between printing magnification factor and the process velocity or rotational velocity of the polygon mirror 34. It is stored in the nonvolatile memory 14 in advance.

Figure 7:
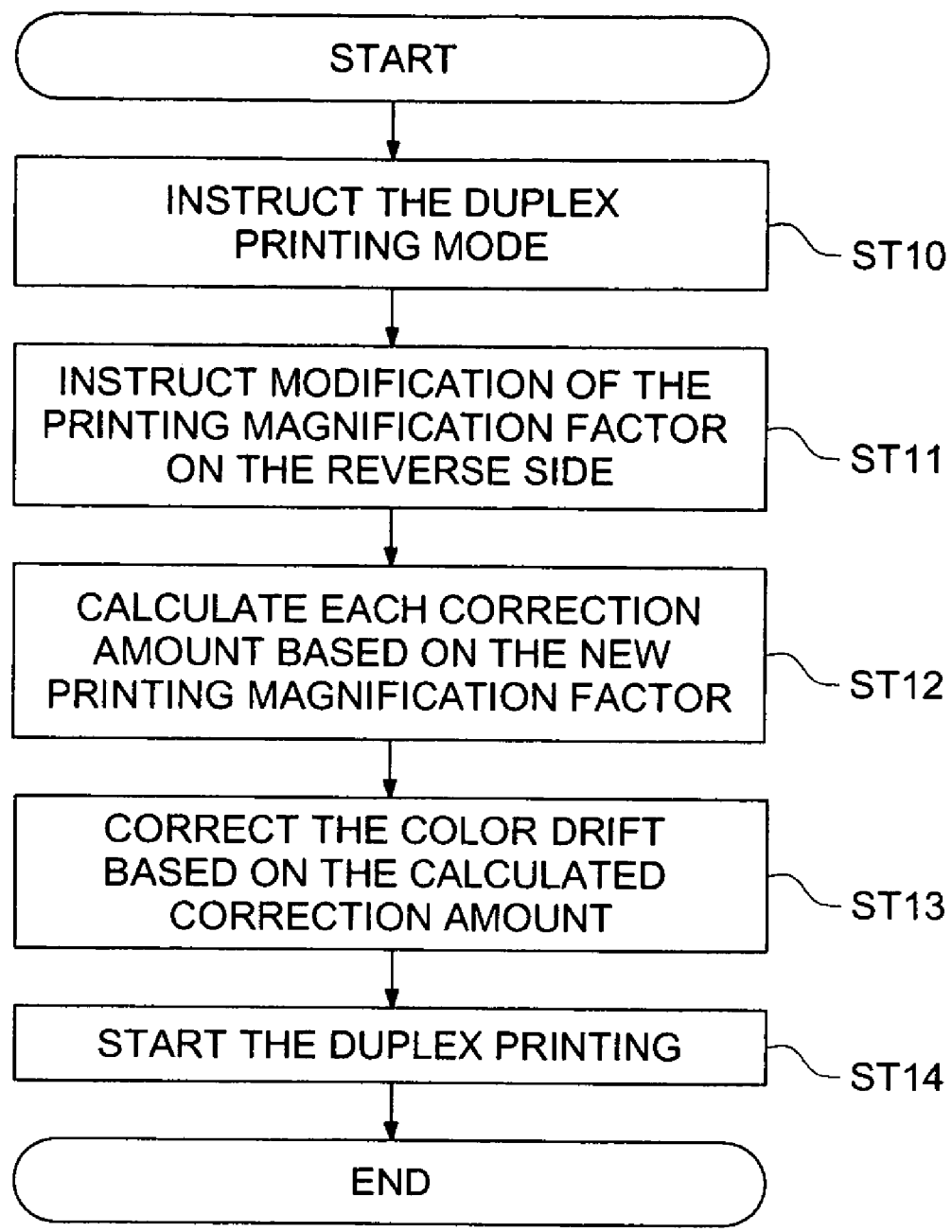
FIG. 7 is a flowchart showing processing of correcting the color drift in the present invention.

In response to the instruction (including the instruction for printing magnification factor modification) inputted through the operating means 16, the control means 15 provides control in such a manner that color drift correction (processing as shown in the flowchart of FIG. 7) is carried out, based on either the automatic color drift correction mode or color drift prediction/correction mode. Details of automatic color drift correction mode or color drift prediction/correction mode will be described later.

The operating means 16 contains a pointing device such as a keyboard, mouse or touch panel, and outputs various input signals to the control means 15.

The display means 18 has a display apparatus such as an LCD (liquid crystal display), and displays various display data inputted from the control means 15.

The laser index sensor 49 detects the beams applied from each of the image write units 3Y, 3M, 3C and 3K, and outputs the INDEX signal to the control means 15.

The image processing means 70 contains the Y-signal switching section 72Y, M-signal switching section 72M, C-signal switching section 72C and K-signal switching section 72K.

Based on the image processing control signal S4, the image processing circuit 71 converts the colors of the signals R, G and B related to the color components R, G and B of the color image captured by the image reading apparatus 102, and outputs the image data Dy, Dm, Dc and Dk to the Y-signal switching section 72Y, M-signal switching section 72M, C-signal switching section 72C and K-signal switching section 72K, respectively.

Image data Dy', Dm', Dc' and Dk' obtained by screening the signals Y, M, C and K based on the image processing control signal S4 are sent to the Y-signal switching section 72Y, M-signal switching section 72M, C-signal switching section 72C and K-signal switching section 72K by the image processing circuit 71.

Based on the write select signal S5, Y-signal switching section 72Y, M-signal switching section 72M, C-signal switching section 72C and K-signal switching section 72K select either the image data Dy or Dy', either the image data Dm or Dm', either the image data Dc or Dc', and either the image data Dk or Dk', respectively, and output each of them to the image write unit 3Y.

Referring to FIG. 3, the configuration of the image write unit 3Y will be described. The following description applies to colors (M, C and K) other than Y.

As shown in FIG. 3, the image write unit 3Y contains a semiconductor laser light source 31, a collimator lens 32, an auxiliary lens 33, a polygon mirror 34, a polygon motor 35, an f(θ) lens 36, a CY1 lens 37 for image formation on mirror surface, a CY2 lens 38 for image formation on drum surface, a reflector 39, a polygon motor drive circuit board 45 and an LD (Laser Diode) drive circuit board 46.

The LD (Laser Diode) drive circuit board 46 applies processing of PWM (Pulse Width Modulation) to the write data Wy, and outputs the laser drive signal SLy of a predetermined width subsequent to processing of PWM, to the semiconductor laser light source 31.

Based on the laser drive signal SLy, the semiconductor laser light source 31 outputs the Y-color laser beam to the collimator lens 32. The laser beam for Y color emitted from the semiconductor laser light source 31 is shaped into a predetermined beam by the collimator lens 32, auxiliary lens 33 and CY1 lens 37 for image formation on mirror surface.

The polygon mirror 34 deflects a laser beam having been shaped by the collimator lens 32 or the like in the main scanning direction. Based on the Y-polygon CLK issued from the control means 15, the polygon motor drive circuit board 45 sends the drive signal for rotating the polygon mirror 34 to the polygon motor 35, which rotates the polygon mirror 34, based on the drive signal issued from the polygon motor drive circuit board 45.

The f(θ) lens 36 and CY2 lens 38 for image formation on drum surface causes the beam deflected by the polygon mirror 34, to form an image on the surface of the photoconductor drum 1Y. This arrangement allows a static latent image to be formed on the photoconductor drum 1Y.

The skew adjust means 9Y consists of an adjusting gear unit 41 and an adjusting motor 42 for driving the adjusting gear unit 41. The adjusting gear unit 41 is connected with the CY2 lens 38 for image formation on drum surface. In response to the skew adjusting signal SSy, the adjusting motor 42 drives the adjusting gear unit 41 and adjusts the inclination of the CY2 lens 38 for image formation on drum surface connected to the adjusting gear unit 41. This procedure ensures skew adjustment.

Further, when part of the beam reflected from the polygon mirror 34 is reflected by the reflector 39 and is put into the laser index sensor 49, the laser index sensor 49 outputs the INDEX signal to the control means 15.

Figure 4:
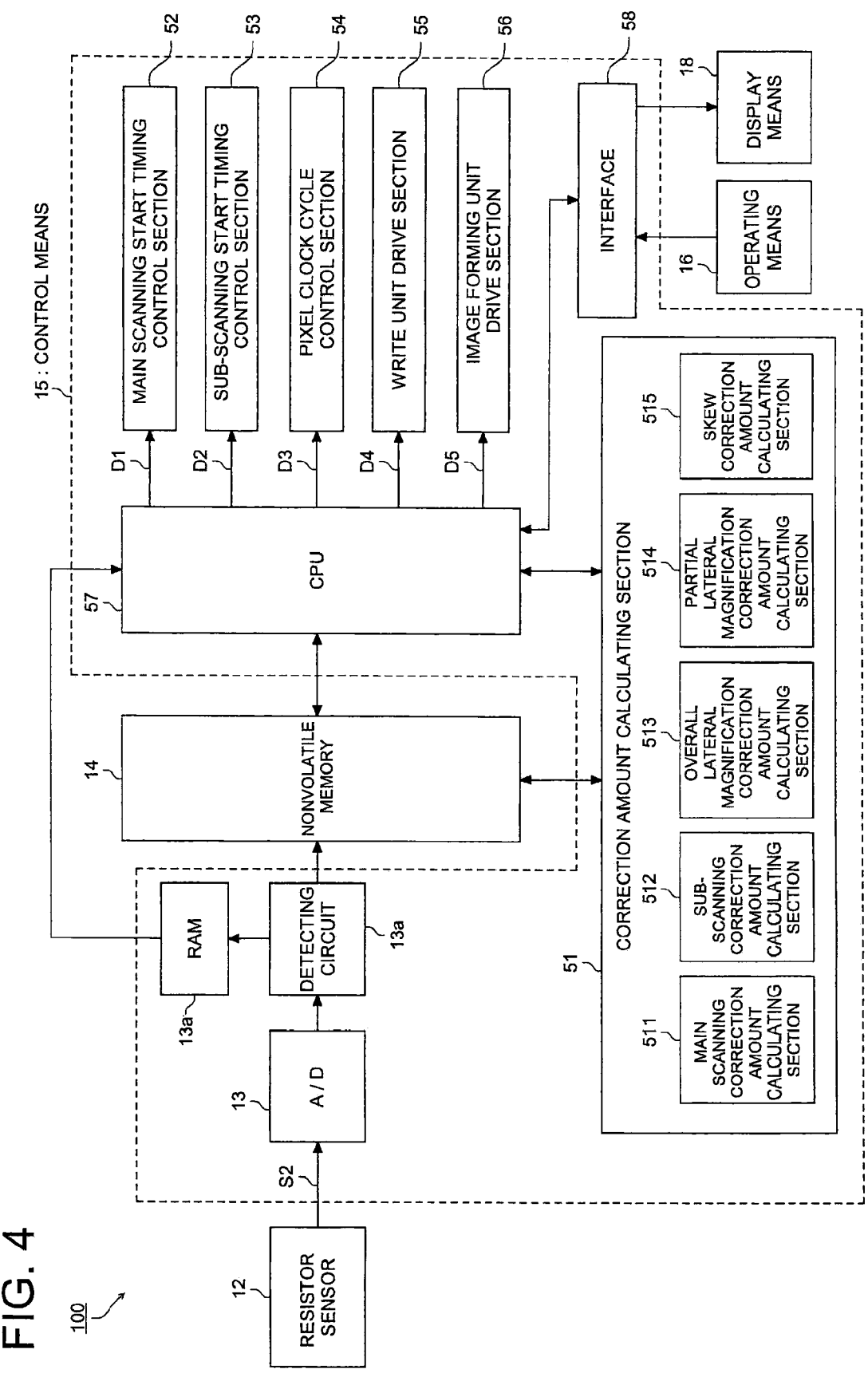
FIG. 4 is a drawing representing the configuration of control means shown in FIG. 2.

Referring to FIG. 4, the following describes the configuration of the control means 15.

As shown in FIG. 4, the control means 15 includes an analog-to-digital converter 13, a detection circuit 13a, a RAM (Random Access Memory) 13b, a correction amount calculating section 51, a main scanning start timing control section 52, a sub-scanning start timing control section 53, a pixel clock period control section 54, a write unit drive section 55, image forming unit drive section 56, a CPU 57, an interface 58 and others.

The analog-to-digital converter 13 converts the position detection signal S2 inputted from the resist sensor 12, into a digital form, and sends it to the detection circuit 13a. The detection circuit 13a extracts position information from the position detection signal S2 sent from the analog-to-digital converter 13, and buffers the extracted position information in RAM 13b. The RAM 13b sequentially sends the buffered position information to the CPU 57.

By executing various programs (especially those shown in the flowchart of FIG. 7) stored in the built-in ROM (Read Only Memory), the CPU 57 controls the components of the control means 15, i.e. the correction amount calculating section 51, main scanning start timing control section 52, sub-scanning start timing control section 53, a pixel clock cycle control section 54, write unit drive section 55, image forming unit drive section 56 and others, thereby setting the process velocity resulting from printing magnification factor or rotation velocity of the polygon mirror 34, and correcting the color drift.

To be more specific, when the instruction for changing the printing magnification factor (magnification factor instruction) has been inputted, the CPU 57 adjusts the process velocity or rotation velocity of the polygon mirror 34 in conformity to the magnification factor instruction.

When changing the printing magnification factor, the CPU 57 changes either the process velocity or rotation velocity of the polygon mirror 34.

When the process velocity is changed, rotation velocity of the photoconductor drums 1Y, 1M, 1C and 1K and that of the transfer belt of the intermediate transfer body 6 are changed. This is accompanied by changes in the printing magnification factor only in the sub-scanning direction. When the rotation velocity of the polygon mirror 34 is changed, only the rotation velocity of the polygon mirror 34 is changed. This is accompanied by the change in the printing magnification factors in both the main and sub-scanning directions.

Thus, when the printing magnification factor has been changed, the printing magnification factors in both the main and sub-scanning directions (when changing the rotation velocity of the polygon mirror 34) or the printing magnification factor in only the sub-scanning direction (when changing the rotation velocity) is changed.

When the automatic color drift correction mode has been set, the CPU 57 creates the resist mark CR of the colors (reference colors (B and K)) and other colors on the surface of the intermediate transfer body 6, based on the new printing magnification factor, and detects the timed interval when the resist mark CR passes by, using the resist sensor 12. Based on the detected timed interval when the resist mark CR passes by, the CPU 57 calculates the position of each resist mark CR; and according to the result of this calculation, the CPU 57 calculates the misregistration of the resist marks CR of other colors relative to the resist mark CR of the reference color. In conformity to the calculated misregistration amount and color drift correction LUT, the CPU 57 allows the correction amount calculating section 51 to calculate various correction amounts (main scanning correction amount, sub-scanning correction amount, overall lateral magnification correction amount, partial lateral magnification correction amount correction amount and skew correction amount). (This is called the processing of automatic correction amount calculation). Further, based on the aforementioned various correction amounts (main and sub-scanning correction amounts), the CPU 57 calculates the output start correction timing in both main and sub-scanning directions or the sub-scanning direction alone. The CPU 57 allows the main scanning start timing control section 52 and sub-scanning start timing control section 53 to correct the color drift at the time of color overlapping, according to the output start correction timing in both main and sub-scanning directions or the sub-scanning direction alone. It allows the write unit drive section 55 to correct it, based on the aforementioned partial lateral magnification correction amount, and permits the image forming unit drive section 56 to correct it, in conformity to the aforementioned skew correction amount.

When the color drift predictive correction mode is set, the CPU 57 calculates the sub-scanning color drift, main scanning color drift and main scanning magnification factor color drift on the predictive basis, in conformity to the changed printing magnification factor. The CPU 57 allows the correction amount calculating section 51 to calculate various correction amounts (main and sub-scanning correction amounts, and overall lateral magnification correction amount), in conformity to the calculated misregistration amount and color drift correction LUT. (This is called the processing of predictive correction amount calculation). Further, the CPU 57 calculates the output start correction timing in both main and sub-scanning directions or the sub-scanning direction alone, based on various correction amounts (main and sub-correction amounts). It allows the main scanning start timing control section 52 and sub-scanning start timing control section 53 to correct the color drift at the time of color overlapping, according to the output start correction timing in both main and sub-scanning directions or the sub-scanning direction alone. At the same time, the CPU 57 permits pixel clock cycle control section 54 to perform this correction, according to the aforementioned overall lateral magnification correction amount.

The color drift correction LUT refers to the data representing the correspondence between the misregistration of the resist mark CR of other colors with respect to the resist mark CR of the reference color, and the output start correction timing. It is stored in the nonvolatile memory 14 in advance.

The correction amount calculating section 51 consists of a main scanning correction amount calculating section 511, a sub-scanning correction amount calculating section 512, an overall lateral magnification correction amount calculating section 513, a partial lateral magnification correction amount calculating section 514, and a skew correction amount calculating section 515. The correction amount calculating section 51 represents various functions of the program executed by the CPU 57.

The correction amount calculating section 51 (consisting of the main scanning correction amount calculating section 511, sub-scanning correction amount calculating section 512, overall lateral magnification correction amount calculating section 513, partial lateral magnification correction amount calculating section 514 and skew correction amount calculating section 515) calculates various correction amounts under the control of the CPU 57 in the processing of color drift correction shown in the flowchart of FIG. 7.

The main scanning correction amount calculating section 511 calculates the main scanning correction amount for correcting the output start timing in the main scanning direction, based on the misregistration amount of the resist mark CR of other colors with respect to the resist mark CR of the reference color, and the color drift correction LUT, and sends the result of this calculation to the control means 15.

The sub-scanning correction amount calculating section 512 calculates the sub-scanning correction amount for correcting the output start timing in the main scanning direction, based on the misregistration amount of the resist mark CR of other colors with respect to the resist mark CR of the reference color, and the color drift correction LUT, and sends the result of this calculation to the control means 15.

The overall lateral magnification correction amount calculating section 513 calculates the overall lateral magnification correction amount for correcting the frequency of the pixel clock signal so as to remove the overall lateral magnification deviation, based on the misregistration amount of the resist mark CR of other colors with respect to the resist mark CR of the reference color, and the color drift correction LUT, and sends the result of this calculation to the control means 15.

The partial lateral magnification correction amount calculating section 514 calculates the partial lateral magnification correction amount for correcting the inclination of the image write units 3Y, 3M and 3C in respective horizontal directions so as to remove the partial lateral magnification deviation, based on the misregistration amount of the resist mark CR of other colors with respect to the resist mark CR of the reference color, and the color drift correction LUT, and sends the result of this calculation to the control means 15.

The skew correction amount calculating section 515 calculates the skew correction amount for correcting the inclination of the CY2 lens 38 for image formation on drum surface in the vertical direction so as to remove the skew deviation, based on the misregistration amount of the resist mark CR of other colors with respect to the resist mark CR of the reference color, and the color drift correction LUT, and sends the result of this calculation to the control means 15.

The correction amount calculating section 51, main scanning start timing control section 52, sub-scanning start timing control section 53, pixel clock cycle control section 54, write unit drive section 55 and image forming unit drive section 56 apply the following processing of color drift corrections (main scanning correction, sub-scanning correction, overall lateral correction, partial lateral correction and skew correction).

The main scanning start timing control section 52 adjusts the output start timing of each color in the main scanning direction, based on the output start correction timing in the aforementioned main scanning direction inputted from the CPU 57, and aligns the write position of each color in the main scanning direction (main scanning correction).

The sub-scanning start timing control section 53 adjusts the output start timing of each color in the sub-scanning direction, based on the output start correction timing in the aforementioned sub-scanning direction inputted from the CPU 57, and aligns the write position of each color in the sub-scanning direction (sub-scanning correction).

The pixel clock cycle control section 54 corrects the frequency of the pixel clock signal, based on the aforementioned overall lateral magnification correction amount inputted from the CPU 57, and corrects the magnification factors of Y, M, C and K with respect to BK (overall lateral correction).

The write unit drive section 55 corrects the inclination of the image write units 3Y, 3M and 3C in each horizontal direction for each color, based on the aforementioned partial lateral magnification correction amount inputted from the CPU 57 (processing of partial lateral magnification correction).

The image forming unit drive section 56 corrects the inclination of CY2 lens 38 for image formation on drum surface in the vertical direction for each color, based on the aforementioned skew correction about inputted from the CPU 57 (processing of skew correction).

The interface 58 converts various instruction signals inputted from the operating means 16, into the data format readable to the CPU 57, and converts various display data sets inputted from the CPU 57, into the data format that can be displayed on the display means 18.

Referring to the FIG. 7, the following describes the processing of color drift correction by the color image forming apparatus 100: The processing of color drift correction is applied when the CPU 57 executes the program.

When the duplex printing instruction and printing magnification factor modification instruction for the reverse side are inputted through the operating means 16 (Step ST10, S11), the process velocity or the rotation velocity of the polygon mirror 34 in response to the printing magnification factor are set according to the printing magnification factor of the reverse side the modification of which has been instructed. At the same time, various correction amounts (main scanning correction amount, sub-scanning correction amount and overall lateral magnification correction amount) are calculated (Step ST12).

In Step ST12, when the automatic color drift correction mode has been set, processing of automatic correction amount calculation is applied. When the color drift predictive correction mode has been set, processing of predictive correction calculation is applied.

Subsequent to Step ST12, the main scanning start timing control section 52, sub-scanning start timing control section 53, pixel clock cycle control section 54, write unit drive section 55 and image forming unit drive section 56 are controlled (Step ST13) in such a manner that color drift can be corrected, based on the correction amount calculated at the time of printing as discussed above. Here the drive of the write unit drive section 55 and image forming unit drive section 56 are not controlled in the case of color drift correction mode (same after the rest).

To be more specific, in Step ST13, the output start correction timing in both main and sub-scanning directions or the sub-scanning direction alone is calculated, based on the correction amount calculated above, and color drift at the time of color overlapping is corrected by the main scanning start timing control section 52 and sub-scanning start timing control section 53, based on the output start correction timing (processing of main scanning correction and sub-scanning correction). Control is also made in such a manner that this correction is performed by the pixel clock cycle control section 54 based on the aforementioned overall lateral correction amount (processing of overall lateral correction); by the write unit drive section 55 based on the aforementioned partial lateral correction amount (processing of partial lateral correction); and by the image forming unit drive section 56, based on the aforementioned skew correction amount (processing of skew correction).

Subsequent to Step ST13, duplex printing is applied to printing paper (Step ST14). To be more specific, in Step ST14, the obverse side of the printing paper is printed first. Then the reverse side is subsequently printed at the process velocity or the rotation velocity of the polygon mirror 34 in response to the new printing magnification factor after having undergone the aforementioned processing of color drift corrections (main scanning correction, sub-scanning correction, overall lateral correction, partial lateral correction and skew correction).

As described above, the color image forming apparatus 100 adjusts the image magnification factor by adjusting the rotation velocity of the polygon mirror 34 or the process velocity, and corrects color drift caused by changing the rotation velocity of the polygon mirror 34 or the process velocity. Especially, the color image forming apparatus 100 corrects the color drift resulting from the change of magnification factor on the reverse side in duplex printing. In other words, in the duplex printing mode, setting of the printing magnification factor and setting of the rotation velocity of the polygon mirror 34 or the process velocity each are performed independently when printing is carried out on the obverse side and on the reverse side. Furthermore, once the instruction of magnification factor for printing on the reverse side has been inputted, the color image forming apparatus 100 allows the correction conditions to be set in conformity to this magnification factor. So long as the magnification factor remains unchanged, printing on the reverse side in the duplex printing mode is automatically carried out under these correction conditions.

Thus, this arrangement permits printing magnification factor for each side and the output start timing for each color of the printing data to be modified even in the duplex printing mode, for example. In particular, this arrangement avoid color drift caused by changing the rotation velocity of the polygon mirror 34 or the process velocity since the magnification factor for the reverse side is adjusted.

Further, another embodiment for finding the correction amount will be detailed in the following.

A table of correction amounts, each of which is calculated on the basis of a reference value (for instance, an amount at modification ratio 0% for the magnification factor) with respect to each of the magnification factors, is stored in the nonvolatile memory of the image-forming apparatus. Incidentally, the reference value is liable to vary with individualities of image-forming apparatuses and/or operating environments (such as temperature, etc.) of an image-forming apparatus. Accordingly, when actually employing the table of correction amounts, the correction amounts are further compensated for by taking degrees of changes, caused by the individualities of image-forming apparatuses and/or operating environments of an image-forming apparatus, into account. In usual practice, such the reference value and compensation amounts are determined as results of measuring relevant factors in the image-forming apparatus concerned. It is also possible, however, to derive them as a result of arithmetic calculations performed in the image-forming apparatus concerned. Further, it is also applicable that a new table, in which the correction amounts are revised to new correction amounts by compensating for them by taking the degrees of changes, caused by the individualities of image-forming apparatuses and/or operating environments of the image-forming apparatus, into account, is stored in the nonvolatile memory in advance, so that the new table can be actually employed.

Still further, in the aforementioned embodiment, there was indicated only an example of inputting method in which the operator inputs the magnification factors for printing the reverse side of the recording medium by himself. However, for instance, the following methods could be applicable as the method of finding the magnification factors for printing the reverse side of the recording medium.

1) The image-forming apparatus proper calculates optimum magnification factors for printing the reverse side, corresponding to a quality of the recording medium employed (for instance, coated paper or non-coated paper, basis weight, etc.).

2) The table of relationships between qualities of the recording mediums and magnification factors for printing the reverse side is established in advance, and the magnification factor is found on the basis of the quality of the recording medium employed.

The description of the present embodiment refers to an example of an image forming apparatus and image forming method of the present invention, without being restricted thereto. The details of the configuration and operation of the color image forming apparatus 100 in the present embodiment can be modified as required, without departing from the spirit of the present invention.

Disclosed embodiment can be varied by a skilled person without departing from the spirit and scope of the invention.

What is claimed is:

1. An image-forming apparatus, comprising:
    an image-forming section to form a multicolor image on a recording medium by recording a plurality of unicolor images in such a manner that said plurality of unicolor images are superimposed with each other on said recording medium, based on printing image data sets, each of which represents each of said plurality of unicolor images; and
    a controlling section that determines at least a sub-scanning velocity in a sub-scanning direction relative to said recording medium, corresponding to a printing magnification factor, and adjusts at least an output-start timing in said sub-scanning direction for every printing image data set representing each of said unicolor images, according to said sub-scanning velocity determined in advance;
    wherein said controlling section adjusts said output-start timing of each of said printing image data sets, so as to prevent said multicolor image from generating a color drift caused by misregistration between said plurality of unicolor images to be superimposed on said recording medium.

2. The image-forming apparatus of claim 1,
    wherein said controlling section also determines a main-scanning velocity in a main-scanning direction relative to said recording medium, corresponding to said printing magnification factor, so as to adjust output-start timings in both said main-scanning direction and said sub-scanning direction for every printing image data set, representing each of said unicolor images, in response to said main-scanning velocity and said sub-scanning velocity, both determined in advance.

3. The image-forming apparatus of claim 1, further comprising:
an inputting section to input said printing magnification factor;
wherein said controlling section adjusts said output-start timing, corresponding to said printing magnification factor inputted by said inputting section.

4. The image-forming apparatus of claim 1,
wherein said controlling section adjusts said output-start timing, based on an amount of said misregistration in said sub-scanning direction at an image-forming position at which each of said unicolor images is recorded with said sub-scanning velocity determined in advance.

5. The image-forming apparatus of claim 4,
wherein said controlling section detects said amount of said misregistration, so as to adjust said output-start timing, based on said amount of said misregistration detected in advance.

6. The image-forming apparatus of claim 4,
wherein said controlling section calculates said amount of said misregistration, so as to adjust said output-start timing, based on said amount of said misregistration calculated in advance.

7. An image-forming apparatus, comprising:
an image-forming section to form a multicolor image on a recording medium by recording a plurality of unicolor images in such a manner that said plurality of unicolor images are superimposed with each other on said recording medium, based on printing image data sets, each of which represents each of said plurality of unicolor images; and
a controlling section that modifies at least a sub-scanning velocity in a sub-scanning direction relative to said recording medium, corresponding to an instruction of modifying a printing magnification factor, and adjusts at least an output-start timing in said sub-scanning direction for every printing image data set representing each of said unicolor images, according to said sub-scanning velocity modified in advance;
wherein said controlling section adjusts said output-start timing of each of said printing image data sets, so as to prevent said multicolor image from generating a color drift caused by misregistration between said plurality of unicolor images to be superimposed on said recording medium.

8. The image-forming apparatus of claim 7,
wherein said controlling section also modifies a main-scanning velocity in a main-scanning direction relative to said recording medium, corresponding to said instruction of modifying said printing magnification factor, and adjusts output-start timings in both said main-scanning direction and said sub-scanning direction for every printing image data set, representing each of said unicolor images, in response to said main-scanning velocity and said sub-scanning velocity, both modified in advance.

9. The image-forming apparatus of claim 7,
wherein said controlling section adjusts said output-start timing, based on an amount of said misregistration in said sub-scanning direction at an image-forming position at which each of said unicolor images is recorded with said sub-scanning velocity modified in advance.

10. The image-forming apparatus of claim 9,
wherein said controlling section detects said amount of said misregistration, and then, adjusts said output-start timing, based on said amount of said misregistration detected in advance.

11. The image-forming apparatus of claim 9,
wherein said controlling section calculates said amount of said misregistration, so as to adjust said output-start timing, based on said amount of said misregistration calculated in advance.

12. An image-forming apparatus, comprising:
an image-forming section to form a multicolor obverse-image on an obverse side of a recording medium by recording a plurality of unicolor images in such a manner that said plurality of unicolor images are superimposed with each other on said obverse side, based on printing image data sets, each of which represents each of said plurality of unicolor images, wherein said image-forming section also forms a multicolor reverse-image on an reverse side of said recording medium in a same manner as that for said obverse side, as needed; and
a controlling section that modifies at least a sub-scanning velocity in a sub-scanning direction relative to said recording medium, corresponding to a printing magnification factor of said multicolor reverse-image, and adjusts at least an output-start timing in said sub-scanning direction for every printing image data set representing said plurality of unicolor images, according to said sub-scanning velocity modified in advance;
wherein said controlling section adjusts said output-start timing of each of said printing image data sets, so as to prevent said multicolor image from generating a color drift caused by misregistration between said plurality of unicolor images to be superimposed on said recording medium.

13. The image-forming apparatus of claim 12,
wherein, when forming duplex images on both sides of said recording medium, said controlling section modifies at least a first sub-scanning velocity, for forming said multicolor obverse-image, in a sub-scanning direction relative to said recording medium, corresponding to said printing magnification factor of said multicolor reverse-image, and then, adjusts at least a second output-start timing in said sub-scanning direction for every printing image data set, representing each of unicolor images for forming said multicolor reverse-image, so that said second output-start timing is different form a first output-start timing in said sub-scanning direction for every printing image data set, representing each of unicolor images for forming said multicolor obverse-image.

14. The image-forming apparatus of claim 12,
wherein, when forming duplex images on both sides of said recording medium, said controlling section also modifies a main-scanning velocity in a main-scanning direction relative to said recording medium, corresponding to said printing magnification factor of said multicolor reverse-image, so as to adjust output-start timings in both said main-scanning direction and said sub-scanning direction for every printing image data set, representing each of said unicolor images, in response to said main-scanning velocity and said sub-scanning velocity, both modified in advance.

15. The image-forming apparatus of claim 12, further comprising:
an inputting section to input said printing magnification factor of said multicolor reverse-image; wherein said controlling section adjusts said output-start timing, corresponding to said printing magnification factor inputted by said inputting section.

16. The image-forming apparatus of claim 12,
wherein said controlling section adjusts said output-start timing, based on an amount of said misregistration in said sub-scanning direction at an image-forming position at which each of said unicolor images is recorded with said sub-scanning velocity modified in advance.

17. The image-forming apparatus of claim 16,
wherein said controlling section detects said amount of said misregistration, and then, adjusts said output-start timing, based on said amount of said misregistration detected in advance.

18. The image-forming apparatus of claim 16,
wherein said controlling section calculates said misregistration amount, so as to adjust said output-start timing, based on said amount of said misregistration calculated in advance.

19. An image-forming method for forming a multicolor image on a recording medium by recording a plurality of unicolor images in such a manner that said plurality of unicolor images are superimposed with each other on said recording medium, based on printing image data sets, each of which represents each of said plurality of unicolor images, comprising:
   determining at least a sub-scanning velocity in a sub-scanning direction relative to said recording medium, corresponding to a printing magnification factor; and
   adjusting at least an output-start timing in said sub-scanning direction for every printing image data set, representing each of said unicolor images, according to said sub-scanning velocity determined in said determining step
   wherein, in said adjusting step, said output-start timing of each of said printing image data sets is adjusted, so as to prevent said multicolor image from generating a color drift caused by misregistration between said plurality of unicolor images to be superimposed on said recording medium.

20. The image-forming method of claim 19, further comprising the step of:
   forming said multicolor image on said recording medium, based on said output-start timing adjusted in said adjusting step and corresponding to said printing image data sets.

21. An image-forming method for forming a multicolor image on a recording medium by recording a plurality of unicolor images in such a manner that said plurality of unicolor images are superimposed with each other on said recording medium, based on printing image data sets, each of which represents each of said plurality of unicolor images, comprising:
   modifying at least a sub-scanning velocity in a sub-scanning direction relative to said recording medium, in response to an instruction of modifying a printing magnification factor; and
   adjusting at least an output-start timing in said sub-scanning direction for every printing image data set, representing said plurality of unicolor images, according to said sub-scanning velocity modified in said modifying step
   wherein, in said adjusting step, said output-start timing of each of said printing image data sets is adjusted, so as to prevent said multicolor image from generating a color drift caused by misregistration between said plurality of unicolor images to be superimposed on said recording medium.

22. An image-forming method for forming a multicolor image on a recording medium by recording a plurality of unicolor images in such a manner that said plurality of unicolor images are superimposed with each other on said recording medium, based on printing image data sets, each of which represents each of said plurality of unicolor images, comprising:
   modifying at least a sub-scanning velocity in a sub-scanning direction relative to said recording medium, corresponding to a printing magnification factor of a multicolor reverse-image, when forming multicolor images on both sides of said recording medium; and
   adjusting at least an output-start timing in said sub-scanning direction for every printing image data set, representing said plurality of unicolor images, according to said sub-scanning velocity modified in said modifying step;
   wherein, in said adjusting step, said output-start timing of each of said printing image data sets is adjusted, so as to prevent said multicolor image from generating a color drift caused by misregistration between said plurality of unicolor images to be superimposed on said recording medium.

23. An image-forming apparatus, comprising:
   an image-forming section to form a multicolor obverse-image on an obverse side of a recording medium by recording a plurality of unicolor images in such a manner that said plurality of unicolor images overlap each other, based on printing image data sets, each of which represents each of said plurality of unicolor images, wherein said image-forming section also forms a multicolor reverse-image on an reverse side of said recording medium in a same manner as that for said obverse side, as needed; and
   a controlling section that modifies at least a sub-scanning velocity in a sub-scanning direction relative to said recording medium, corresponding to a printing magnification factor of said multicolor reverse-image, so as to adjust at least an output-start timing in said sub-scanning direction for every printing image data set, representing said plurality of unicolor images, in response to said sub-scanning velocity modified in advance;
   wherein, when forming duplex images on both sides of said recording medium, said controlling section modifies at least a first sub-scanning velocity, for forming said multicolor obverse-image, in a sub-scanning direction relative to said recording medium, corresponding to said printing magnification factor of said multicolor reverse-image, and then, adjusts at least a second output-start timing in said sub-scanning direction for every printing image data set, representing each of unicolor images for forming said multicolor reverse-image, so that said second output-start timing is different form a first output-start timing in said sub-scanning direction for every printing image data set, representing each of unicolor images for forming said multicolor obverse-image.

* * * * *